July 10, 1934.  L. L. GAGNON  1,966,009
OPHTHALMIC MOUNTING
Filed Jan. 30, 1932
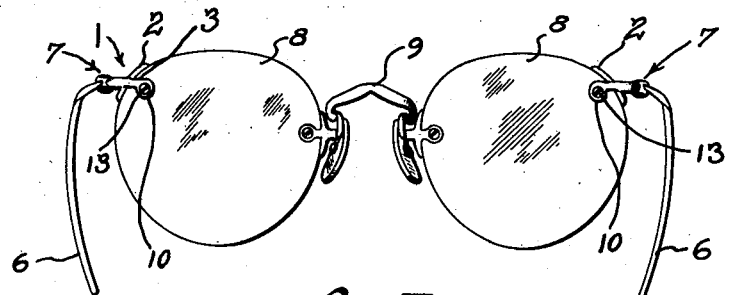
Fig. I.
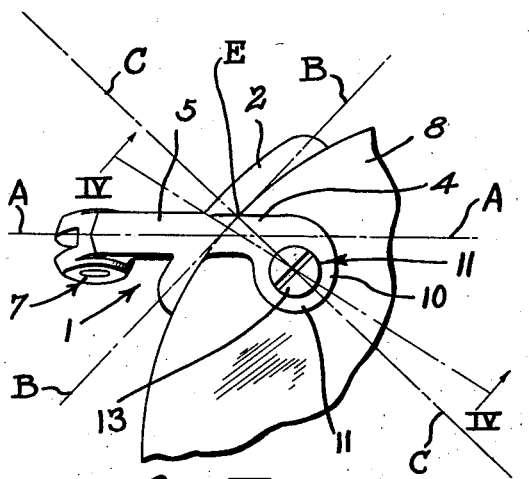
Fig. II.
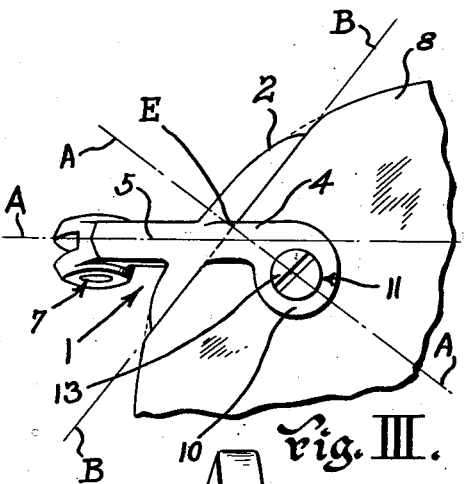
Fig. III.
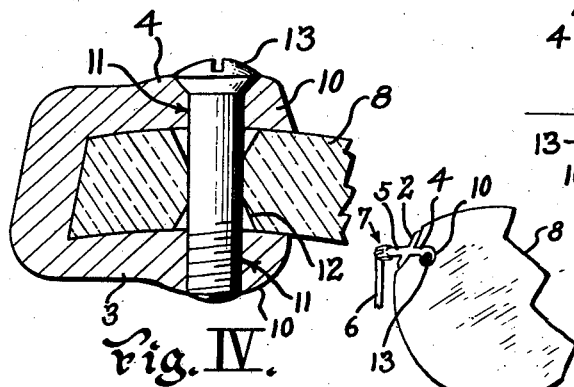
Fig. IV.
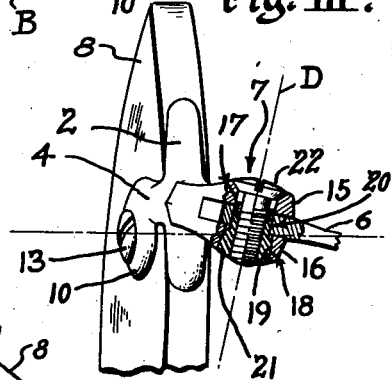
Fig. V.
Fig. VI.
INVENTOR
Louis L. Gagnon.
BY Harry H. Styll
ATTORNEY Patented July 10, 1934

1,966,009

UNITED STATES PATENT OFFICE 1,966,009

OPHTHALMIC MOUNTING

Louis L. Gagnon, Southbridge, Mass., assignor to American Optical Company, Southbridge, Mass., a voluntary association of Massachusetts Application January 30, 1932, Serial No. 589,879

4 Claims. (Cl. 88—53)

This invention relates to improvements in ophthalmic mountings and has particular reference to an improved lens strap for use in the construction of frameless spectacles and eyeglasses and also relates to the method of making the same.

One of the principal objects of the invention is to provide an improved lens strap wherein the various parts of a rimless ophthalmic mounting may be rigidly attached to the lenses above the useful field of vision and in desired aligned relation with each other without deformation of parts and also to an improved method of making the same.

Another object is to provide an improved high endpiece connection wherein the lens strap will have equalized bearing surfaces engaging with the peripheral edge of the lens on each side of the connecting means regardless of the angle of said edge with respect to the horizontal meridian of the lens when the said lens is positioned as worn on the face.

Another object is to provide a lens strap having temple and lens connecting means lying substantially in the same plane and having lens edge engaging means lying at an angle with said plane.

Another object is to provide a lens strap with a peripheral edge engaging portion which lies in a plane substantially parallel with a line tangent with the edge of the lens at the point of attachment of said lens strap to the lens, and which has a connecting portion formed with a perforated end which lies substantially on a line normal to said tangent line and passing through the peripheral edge engaging portion at a point intermediate its ends, said connecting portion being attached to the peripheral edge engaging portion at a point offset from said normal line.

Another object is to provide improved connecting means for attaching the temples or bridge member to the lens of an ophthalmic mounting wherein an increased thread bearing is obtained and the connecting screw is prevented from backing out and becoming loose during the use of the mounting.

Another object is to provide improved means and method of forming connecting means for uniting the various parts of a frameless type mounting wherein the said means will be exceedingly rigid, durable and inconspicuous and be of such shape as to position the parts in a desired aligned relation with each other above the useful field of vision.

Another object of the invention is to provide a lens strap having a lens edge engaging portion which is shaped to fit a definitely formed attaching seat on the peripheral edge of the lens and to have an outer surface which is shaped to blend with and form a continuation of the contour shape of the lens when in position on said seat.

Other objects and advantages of the invention will become apparent from the following description taken in connection with the accompanying drawing, and it will be understood that many changes may be made in the arrangement of parts, details of construction and methods shown and described without departing from the spirit of the invention as set forth in the accompanying claims. I, therefore, do not wish to be limited to the exact arrangement of parts, details of construction and methods shown and described as the preferred forms only have been shown by way of illustration.

Referring to the drawing:

Fig. I is a front view of an ophthalmic mounting embodying the invention;

Fig. II is an enlarged fragmentary view of Fig. I showing one of the lens connections embodying the invention;

Fig. III is a view similar to Fig. II showing a modification of the invention;

Fig. IV is an enlarged sectional view taken on line IV—IV of Fig. II;

Fig. V is a side elevation of Fig. II showing a portion in section; and

Fig. VI is a front elevation of a further modification.

In order to maintain a straight line effect across the temple connections when said connections are placed above the centers of the lenses instead of on said centers as has been the former practice it is evident that the structure engaging the contour edge of the lens in relation to the line of the temple connection has to be decidedly changed and that to get the proper bearing surface on the edge of the lens and still maintain said straight line effect the structure and position of the lens engaging members also have to be materially changed. The problem of these changes to produce the desired results and maintain the old advantages constitutes an important feature of the invention.

A recent change in the demand of ophthalmic mountings has brought about this high temple arrangement which, as far as the rimmed type mounting is concerned, has proven quite successful. Many attempts have been made to incorporate this high temple arrangement in a rimless type mounting but difficulties, such as impractical structural details and means of attaching the temple connections to the lenses wherein the said connections will be rigid and durable, have rendered such high temple arrangements impractical for use. The shape of the peripheral edge of the lens at the point of attachment of the high endpiece arrangement made it difficult to place the parts in proper aligned relation with each other and to obtain a proper bearing surface adjacent the lens strap connection to the lens, that is, without forming a device which was exceptionally conspicuous and of practically no sales value.

The prime object, therefore, of applicant's device is to overcome the above defects by providing means which are durable and inconspicuous and which may be placed in proper aligned relation with each other and maintain a rigid connection with the lenses and have an efficient edge bearing surface at the connection to the lenses.

Referring more particularly to the drawing wherein like characters of reference designate like parts throughout the several views, the improved lens mount or strap 1 embodying the invention comprises a peripheral lens edge engaging portion 2, a pair of spaced integral extensions or arms 3 and 4 which extend inwardly on opposite sides or faces of the lens, and an outwardly extending portion 5 to which the temple or side 6 is pivotally attached as indicated at 7.

The improved lens mount or strap 1 is shown embodied in a rimless type mounting which comprises the usual lenses 8 connected by a bridge member 9 and having the temples or sides 6 for supporting the mounting on the face of the wearer.

The extensions or arms 3 and 4 are preferably provided with a depending enlarged portion 10 having a perforation 11 therein. The said perforations are in direct alignment with a perforation 12 formed in the lens and are attached to said lens by a screw or like means 13 which extends through the aligned openings and is threadedly connected to one of said perforated ends as shown in Fig. IV. The extensions or arms 3 and 4 and outwardly extending portion 5 lie substantially on a straight line, as indicated by dot and dash line A, but the enlarged depending perforated lens engaging portions 10 are offset downwardly from said line when the device is in normal position on the face.

The peripheral lens edge engaging portion 2 is shaped to fit the contour edge of the lens and lies in a plane which intersects the line A at other than right angles and is substantially parallel with a line B. The line B is tangent with the edge of the lens substantially at the point E of the lens edge engaging portion 2. The centers of the perforations 11 lie below the line indicated by dot and dash line A when the device is in normal position on the face and are on a line C which is normal to the tangent line B and which intersects said tangent line at substantially the point of tangency, that is, they lie on a line which is substantially normal to the lens edge engaging portion 2 and which intersects said lens edge engaging portion adjacent the point E. The arms 3 and 4 are attached to the lens edge engaging portion 2 at a point offset or to one side of the point E where the line C intersects the line B as shown in Figures II and III. In Fig. II the peripheral edge of the lens where the lens strap is attached is shown having a convex shape and as being a continuation of the peripheral shape of the lens.

In Fig. III, the edge of the lens where the lens strap is attached is shown as being straight and the outer surface of the lens edge engaging portion 2 forms a continuation of the general contour shape or edge of the lens. In Fig. VI, the edge of the lens is shown concaved. In all instances the lens edge engaging portions 2 are shaped to fit the peripheral edge of the lens at the place of attachment of the lens strap 1 to the lens and have a substantial bearing surface on each side of the lens connecting means 13.

The outwardly projecting portion 5 is formed with a pair of spaced ears 15 and 16, as shown in Fig. V, having aligned perforations 17 and 18 therein. The perforation 18 is provided with tapered walls 19 which are shown extending the full depth of the perforation. The end of the temple 6 is provided with a perforation 20 which is adapted to be aligned with the perforations 17 and 18 and is held in aligned relation with said perforations by a tubular member 21. The tubular member 21 is provided with an enlarged tapered portion which is adapted to engage with the tapered walls 19 of the opening 18 and is forced into frictional engagement with said tapered walls 19 by tightening a screw member 22. The member 22 extends through the perforation 17 and is threaded into the tubular member. The tubular member 21 forms a pivot bearing on which the temple 6 is adapted to be hinged and prevents the screw member from being backed out or loosened by the swinging of the temple. It also provides a long thread bearing for the screw. The axis of the hinge pivot 7 as formed by the tubular member 21 and screw 22 is preferably inclined to the plane of the lens 8 as indicated by the dot and dash line D in Fig. V. The tubular arrangement may be used instead of the screw 13 if desired to attach the arms or straps 3 and 4 to the lens 8, it being simply necessary to form a tapered opening in one of said arms to receive the tapered portion of the tubular member 21.

The ends of the bridge 9 are shown attached to the lenses 8 by the usual prior art type of lens strap attachments but it is to be understood that the said bridge member may be connected to the lenses 8 above the useful field of vision by means of attachments similar to those connecting the end pieces 1 to the lenses 8 as shown in Figures II and III of the drawing.

Attention is directed to the fact that the outwardly projecting portion 5 and arms 3 and 4 are in aligned relation with each other and lie in a plane substantially parallel with a line passing through the geometrical centers of both lenses when the said lenses are positioned as worn on the face. The ends 10 and perforations 11 are normally positioned below said parallel line and lie on a line C substantially normal to the lens edge engaging portion 2 and intersecting said portion intermediate its ends as indicated at E. This provides a substantial bearing surface on each side of the lens strap and provides a rigid and durable construction. The lens edge engaging portion 2 in all instances lies at an angle other than a right angle to the plane of the portion 5 and aligned arms 3 and 4 and fits snugly against the peripheral edge of the lens. The arms 3 and 4 which carry the enlarged perforated ends 10, are attached to the lens edge engaging portion 2 at a position offset from the normal line C and are in alignment with the portion 5. The recess 12 in the lens 8 is drilled in the lens at the same distance from the edge of the lens as is usual in standard practice and is drilled on a line substantially normal to one of the faces of the lens. The arm 3 is slightly longer than the arm 4 and in this manner permits the openings 11 in said arms to be aligned with each other and with the opening 12 in the lens. That is, the axis of the openings lies in a plane subsantially normal to the faces of the lens. This enables the connecting means to be attached to lenses of meniscus shape without previously having to bend and distort the perforated portions to fit the surfaces of the lens and also permits ease in aligning the openings in the connecting means with the opening in the lens so that the connecting screw can be placed therein without straining the lens. The complete device is rigid and durable and permits the various parts to be attached to the lens in desired aligned relation with each other above the useful field of vision and maintains said alignment without strain on the lenses. The device is extremely simple and inconspicuous and can be readily fitted to any shape lens without distortion of parts and provides positive means for engaging the edge of the lens with substantial bearing surfaces on each side of the connecting means regardless of the shape of the periphery of the lens at the point of attachment.

From the foregoing description it will be seen that I have provided simple, efficient and economical means and methods of obtaining all of the objects and advantages of the invention, particularly of providing rigid and durable means of attaching the various parts to the lenses of a rimless type mounting wherein the said parts may be placed in desired aligned relation with each other above the useful field of vision.

Having described my invention, I claim:

1. A device of the character described for connecting a lens to its mounting, comprising lens edge engaging means having an attaching zone intermediate its ends and having a lens face engaging ear extending outwardly of the side thereof opposite the attaching zone, said ear having a relatively straight portion which when held in its position of use lies in a horizontal plane with its longitudinal axis intersecting the attaching zone, said ear having a depending end portion projecting below the bottom line of the straight portion, said depending portion providing an attaching portion for lens securing means, the center of said lens securing means lying below the longitudinal axis of the straight portion and lying on a line which is normal to the lens edge engaging surface of the lens edge engaging means at a point above the point where the longitudinal axis of the straight portion intersects said lens edge engaging surface, the upper portion of the lens edge engaging means lying at an acute angle relative to said straight portion and the lower portion of said lens edge engaging means lying at an obtuse angle relative to said straight portion.

2. A device of the character described for connecting a lens to its mounting, comprising a relatively long bar like member extending in substantially a straight line from end to end when viewed from the front, the portion adjacent one end being formed into a hinged connection and the portion adjacent the other end being bifurcated to form spaced lens face engaging ears, said ears each having a relatively straight portion in aligned relation with the relatively long bar like member and each having an offset portion projecting below the bottom line of said straight portion, and a lens edge engaging member extending above and below the top and bottom lines respectively of the straight portions and bar like member substantially at the base of the bifurcation, said ears providing an attaching portion for lens securing means, the center of said lens securing means lying below the longitudinal axis of said straight portions and bar like member and lying on a line which is normal to the lens edge engaging surface of the lens edge engaging member at a point above the point where the longitudinal axis of said straight portions and bar like member intersects said lens engaging member, said upper portion of the lens edge engaging member lying at an acute angle relative to the straight portions of the ears and the lower portion of said lens edge engaging member lying at an obtuse angle relative to said straight portions.

3. A device of the character described for connecting a lens to its mounting, comprising lens edge engaging means having an attaching zone intermediate its ends and having a lens face engaging ear extending outwardly of the side thereof opposite the attaching zone, said ear having a relatively straight portion which when held in its position of use lies in a horizontal plane with its longitudinal axis intersecting the attaching zone, said ear having a depending end portion projecting below the bottom line of the straight portion, said depending portion providing an attaching portion for lens securing means, the center of said lens securing means lying below the longitudinal axis of the straight portion and lying on a line which is normal to the lens edge engaging surface of the lens edge engaging means at a point above the point where the longitudinal axis of the straight portion intersects said lens edge engaging surface, the upper portion of said lens edge engaging means being relatively long and lying at an acute angle relative to said straight portion and the lower portion of said lens edge engaging means being relatively short and lying at an obtuse angle relative to said straight portion.

4. A device of the character described for connecting a lens to its mounting, comprising a relatively long bar like member extending in substantially a straight line from end to end when viewed from the front, the portion adjacent one end being formed into a hinged connection and the portion adjacent the other end being bifurcated to form spaced lens face engaging ears, said ears each having a relatively straight portion in aligned relation with the relatively long bar like member and each having an offset portion projecting below the bottom line of said straight portion, and a lens edge engaging member extending above and below the top and bottom lines respectively of the straight portions and bar like member substantially at the base of the bifurcation, said ears providing an attaching portion for lens securing means, the center of said lens securing means lying below the longitudinal axis of said straight portions and bar like member and lying on a line which is normal to the lens edge engaging surface of the lens edge engaging member at a point above the point where the longitudinal axis of the straight portions and bar like member intersect said lens edge engaging member, said upper portion of the lens edge engaging member being relatively long and lying at an acute angle relative to the straight portions of the ears and the lower portion of said lens edge engaging member being relatively short and lying at an obtuse angle relative to said straight portions.

LOUIS L. GAGNON.